United States Patent [19]

Ettinger

[11] Patent Number: 4,513,193

[45] Date of Patent: Apr. 23, 1985

[54] AUTOMATIC STUD WELDING EQUIPMENT WITH FLUID AND STUD FEEDING

[75] Inventor: Donald H. Ettinger, Royal Oak, Mich.

[73] Assignee: USM Corporation, Farmington, Conn.

[21] Appl. No.: 447,269

[22] Filed: Dec. 10, 1982

[51] Int. Cl.³ .............................................. B23K 9/20
[52] U.S. Cl. ......................................... 219/98; 219/72
[58] Field of Search ................ 219/98, 99, 74, 137.63, 219/137.9, 72

[56] References Cited

U.S. PATENT DOCUMENTS 3,418,441  12/1968  Wieland et al. ...................... 219/98

FOREIGN PATENT DOCUMENTS 1094703  12/1967  United Kingdom .
1347527   2/1974  United Kingdom .
2098115  11/1982  United Kingdom .

*Primary Examiner*—Roy N. Envall, Jr.
*Assistant Examiner*—Alfred S. Keve
*Attorney, Agent, or Firm*—Aubrey C. Brine

[57] ABSTRACT

A transfer member is provided for welding apparatus wherein fluid is deposited about the weld area during the welding process and T-studs are automatically fed from a remote source to a welding gun. The transfer member comprises two tubular members, one disposed within the other, and sealed one from the other. Studs are transferred through the inner tubular members and fluid, in the form of gas or liquid, is transferred through the outer tubular member.

5 Claims, 3 Drawing Figures

AUTOMATIC STUD WELDING EQUIPMENT WITH FLUID AND STUD FEEDING

BACKGROUND OF THE INVENTION

The present invention relates to automatic stud welding equipment, wherein a fluid is employed in the welding process, and more particularly to a transfer member for feeding both weld studs and fluid to a welding gun.

In U.S. Pat. Nos. 3,582,602 and 3,546,420 assigned to the assignee of the present invention, a stud welding systems is depicted wherein small studs or buttons are fed to a welding device of the gun type. Such devices have become well known in the stud welding art, and generally employ a feed tube of the type shown in these aforementioned patents as a vehicle for feeding studs, from a remote source of supply, to the welding gun. Generally, the feed tube takes the form of a flexible plastic member having an internal conduit in the configuration of the profile of the fastener to be transferred therethrough, which conduit extends throughout the length of the tubular member. Such a feed tube is shown in the aforementioned U.S. Pat. No. 3,582,602.

It is also known in the prior art to provide a tubular member as shown in the prior art discussed above with a secondary sleeve of plastic material in spaced relation with the tubular member in order to protect the tubular member from damage, and to prevent a kink, or sharp bend, occurring in the tubular member which would inhibit flow of the stud through the transfer member.

It has been found however, that there are welding units, which in addition to providing for the automatic feeding of studs to the welding device or welding gun, also require the employment of a fluid such as gas or liquid, in the area of the stud welding operation. One such device is shown in U.S. Pat. No. 4,284,870 which is assigned to the assignee of the present invention. These devices heretofor have required a fluid conduit in addition to the transfer member for studs, each of which is connected to the welding gun at its outlet end, and each of which is connected to a remote source of supply at the inlet. The provision of these two tubular members connected at difference points onto the welding gun may prove to be cumbersome and can lessen the maneuverability of the welding gun at the point of operation.

It is therefor an object of the present invention to provide a transfer member for welding apparatus, wherein fluid is deposited about the weld area during the welding process, and wherein studs are automatically transported from a remote source, through a transfer member, which is simple in construction and adaptable to welding guns of the type presently in use.

It is a further object of the invention to provide a transfer member for use with a stud welding device wherein a fluid is employed in the welding process, wherein both studs and fluid are transferred through a unitary transfer means.

SUMMARY OF THE INVENTION

These objects and other objects which will be apparent as the description proceeds are accomplished by providing in combination with stud welding apparatus wherein a fluid is transported from a remote source of supply is and deposited about the weld area during the welding process, and the studs are automatically fed from a remote source of supply to a stud welding device, the improvement comprising a unitary means for transporting both the studs and fluid to the welding device.

In accomplishing this, a transfer member is provided comprising an inner tubular member through which studs are transported, and an outer tubular member enveloping the inner tubular member through which fluid is transported to the welding device. An outlet port is disposed at one end of the transfer member communicating with the outer tubular member only and an inlet port is located at the opposite end of the transfer member communicating with the outer tubular member only.

Means is provided at either end of said transfer member for disconnecting said inner tubular member only, from either said remote source of stud supply or from said welding device.

BRIEF DESCRIPTION OF THE DRAWING

The foregoing and other features of the invention, together with novel details in construction and combination of parts, will now be more particularly described in connection with an illustrative embodiment, and with reference to the accompanying drawing, wherein:

FIG. 3 is a sectional view taken along the lines III—III of FIG. 2.

DESCRIPTION OF THE PREFERRED EMBODIMENT

Figure 1:
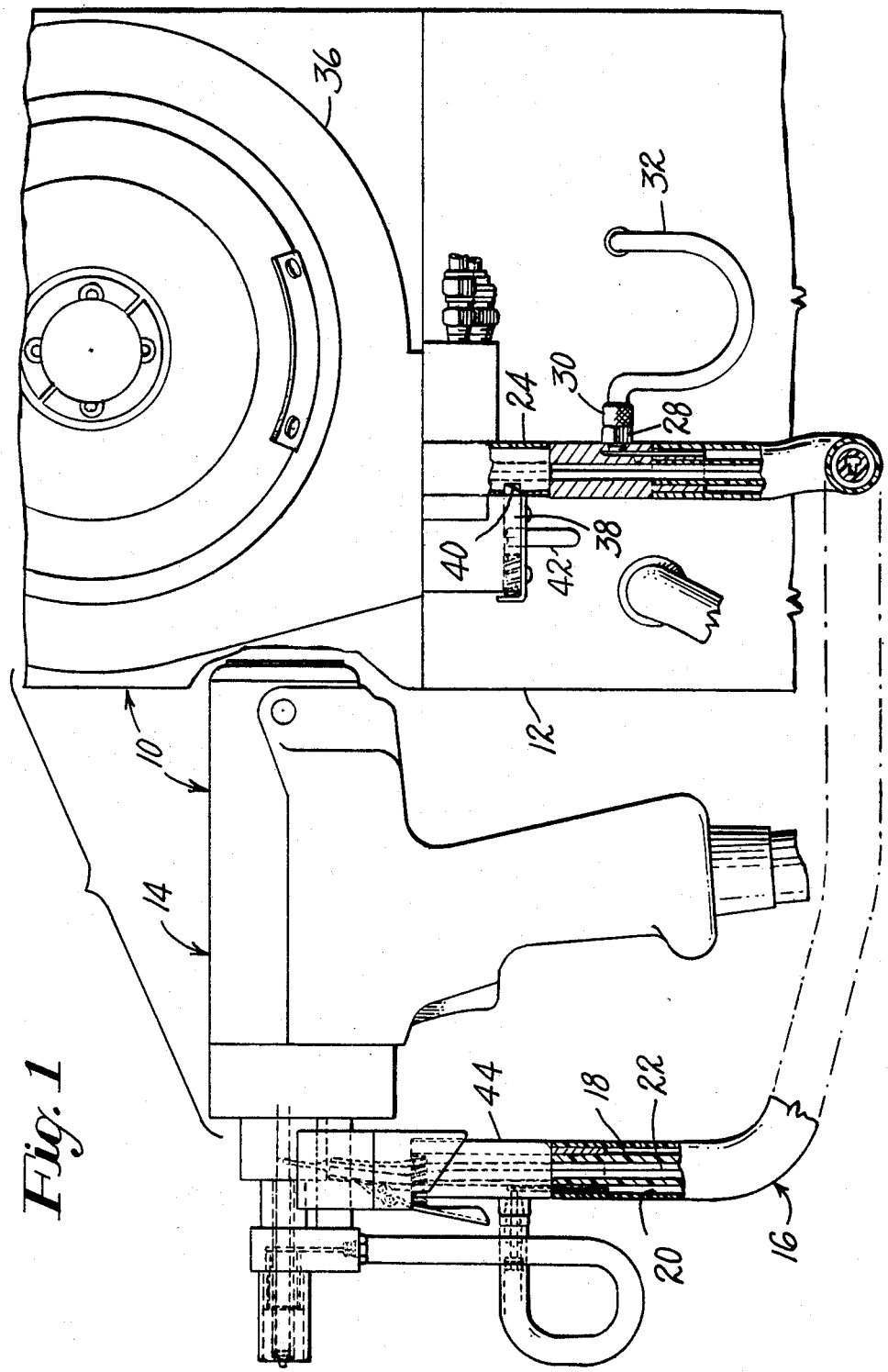
FIG. 1 is a fragmentary elevational view showing portions of welding apparatus constructed in accordance with the present invention.

Referring now to the drawing and in particular to FIG. 1, there is shown welding apparatus 10 comprising a console 12 and welding gun 14. The welding apparatus 10 is of the type wherein the console 12 is substantially a stationary element which provides a source of power and materials to the welding gun 14 which in this instance is designed to be manually operated at points remote from the console 12. As various types of console are known in the art and the method of storage and feeding of the materials internally in the console form no part of the present invention, only those portions of the console 12 which are pertinent to the present invention will be described in detail.

The welding gun 14 is of the type described in U.S. Pat. No. 4,284,870 issued to Donald H. Ettinger and assigned to the assignee of the present invention. The device is capable of welding studs to a work surface wherein a substantially smut-free surface is produced adjacent the weld. To accomplish this, a thin coating of liquid in spray form is provided on the work surface adjacent the area where the stud is to be welded, prior to the welding operation. For a further understanding of the device, reference should be had to the above cited patent wherein the welding gun is described in detail, and only those portions of the gun which are necessary for an understanding of the present invention are described herein.

Figure 2:
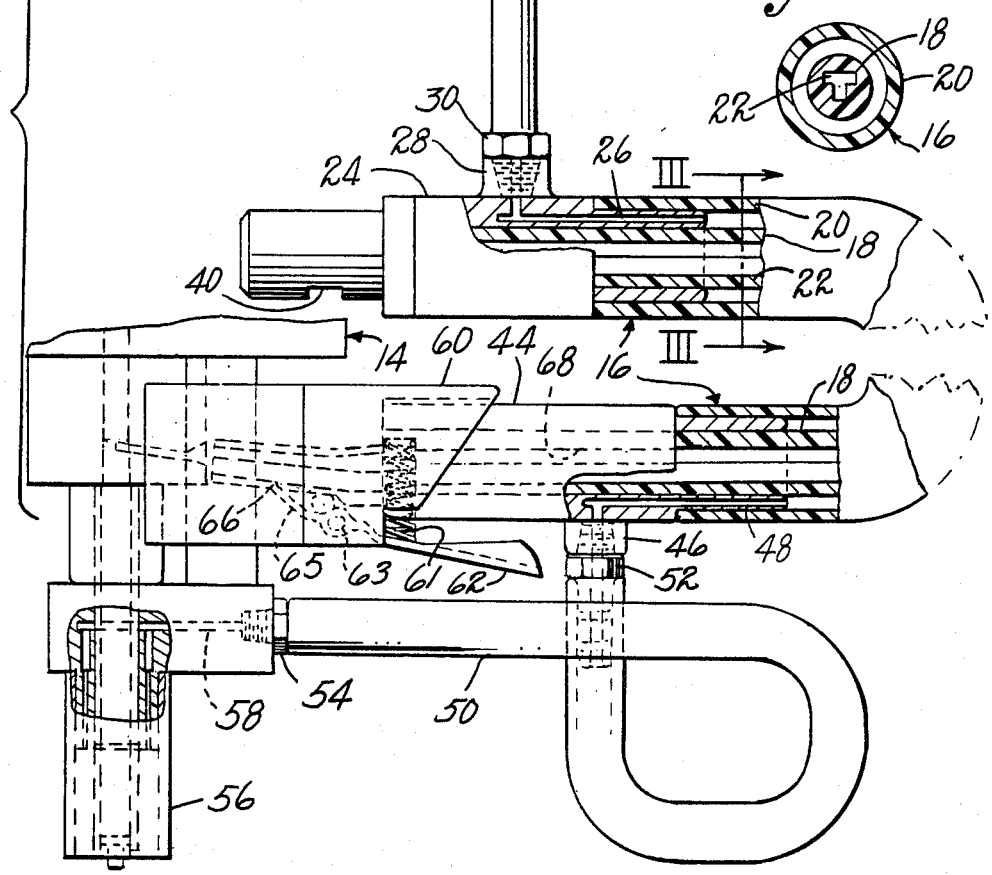
FIG. 2 is a fragmentary elevational view, partially in section showing portions of the welding structure of FIG. 1, taken on an enlarged scale for clarity.

As the welding gun 14 is designed to be operated at remote location from the source of materials, it is necessary to provide transfer means for the materials, extending between the console 12 and the gun 14. In the present embodiment, in which the gun 14 is of the type described in the aforementioned U.S. Pat. No. 4,284,870, it is required that T-studs (that is, button headed studs which are T shaped in profile) of the type commonly employed in automotive production for fastening trim and the like, and liquid to be employed in the smut-free welding operation be delivered to the welding gun 14. In the present embodiment of the invention, delivery of both materials to the gun 14 is provided by a single unitary transfer member 16, interconnecting the gun 14 with the console 12. Referring now to FIG. 2, it will be noted that the transfer member 16 is provided in the form of a pair of tubular members one disposed within the other, the inner tubular member 18 through which button headed T-studs are fed, and an outer tubular member 20 of flexible plastic material encompassing the inner tubular member. The inner tubular member 18 is generally of plastic material and has formed therein a passage 22 extending for the length of the member, which is of a configuration approximating that of the profile of a button headed T-stud but slightly larger so that T-studs may be fed therethrough.

At the end of the transfer member 16 which is attached to the console 12 there is provided a connector 24, which is disposed in interfitting engagement with the tubular member 18 and 20 as best shown in FIG. 2. The connector 24 contains a circular passage 26 extending part way through the connector and leading from an internally threaded boss 28 to the opening between the tubular members 18 and 20. The boss 28 receives a fitting 30 to which is connected a flexible line 32 leading from the fluid source 34 to the boss 28.

The passage 22 in the tubular member 18 interconnects with a similar shaped passage (not shown) in the connector 24, and with the connector received into the console 12 (as shown in FIG. 1) the passage is in alignment for receiving button headed T-studs from a device 36, which may be a feeder of any type well known in the art.

A locking device is provided at the point of entry of the connector 24 into the console 12, and comprises a spring biased detent 38 which is received in a notch 40 formed in the connector 24. An arm 42 is provided for quick release of the connector 24 in the event of a need to remove T-studs which have become jammed by malfunction of feeding, which might occur during operation of the welding apparatus 10.

While the fluid source 34 depicted in the present embodiment is substantially that of the type shown and described in the aforementioned U.S. Pat. No. 4,284,870, which provides liquid to the welding gun 14 during operation of the welding apparatus 10, it should be understood that the source may be replaced with a source of other fluids such as gas or a mixture of air and gas, which might be used in other welding operations than those disclosed in the aforementioned patent, without departing from the spirit of the present invention.

At the opposite end of the transfer member 16, a connector 44 is connected to the transfer member in a similar manner to the connector 24, having a portion thereof extending into, and sealingly engaged in the area between the inner tubular member member 18 and the outer tubular member 20. The connector 44 is further provided with an internally threaded boss 46 through which a passageway 48 leads through connector 44 and into the area between the inner tubular 18 and the outer tubular member 20. A flexible line 50 is provided with a fitting 52 which is received into the boss 46 at one end of the line and a fitting 54 at the opposite end of the line which is received into the body of the gun 14 adjacent the nozzle 56 of the welding gun.

The flexible line 50 serves to conduct fluid material from the transfer member 16 to the welding gun 14, where it enters a conduit 58 leading to the nozzle 56.

As best shown in FIG. 2, the connector 44 is received into a receptacle 60 which has mounted therein a quick disconnect in the form of a lever 62 pivoted about a pin 63 and a biasing spring 61. The lever 62 has a finger 65 which is received into a notch 66 formed in the connector 44 and is retained in the receptacle 60 by virtue of the spring 64 until the quick disconnect lever 62 is actuated to release the connector from the receptacle.

The passage 22 extends into a passage 68 of like cross-sectional dimension, extending through the connector 44 which allows the button headed T-studs to be deposited into the welding gun 14, in position to be operated on by the gun, in the manner well known in the art.

The quick disconnect provided at the receptacle 60 is for the purpose of removing the connector 44 in the event T-studs become jammed in the gun, during operation of the apparatus 10.

It should further be evident that by providing a quick disconnect means at that portion of the connector 24 or 44 having access only to the passage 22, the fluid passage is not disturbed, should a jammed T-stud require removal of the transfer member from either the console 12 or the gun 14. This feature is of importance when the fluid employed is a liquid, in that no loss of liquid takes place during removal of a jammed T-stud, and operation of the gun may be initiated without first refilling the transfer member 16 with the liquid.

In operation, T-studs are fed in series from the device 36 into the transfer member 16 by air pressure, and travel to the gun 14 which operates to apply the studs to the work surface. However, in the instant invention, fluid material in the form of liquid or gas is fed through the space provided between the inner tubular member 18 and the outer tubular member 20 to the point on the welding gun 14 at which the fluid is to be employed in the gun. A unitary means is therefore provided which accomplishes transfer of both studs and fluid from the source of supply to the welding gun.

It is therefore evident, that the present invention provides a novel transfer member, which serves a dual purpose, and therefore reduces the cost of manufacturing the welding apparatus 10, in addition to providing the operator with a manual tool which is less cumbersome to operate than one having a plurality of lines extending from the tool.

I claim:

1. In combination with stud welding apparatus wherein fluid is fed from a remote source of supply and deposited about a weld area in a welding process and studs are automatically fed from a remote source of supply to a stud welding device, the improvement comprising:

a transfer member comprising an inner tubular member having one end connected to said welding device and the opposite end in receiving relationship with said stud source through which studs are transported from said source of supply to said welding device, an outer tubular member enveloping said inner tubular member;

an outlet port formed in said outer tubular member adjacent said welding device and an inlet portion disposed at the opposite end thereof for receiving fluid employed in the welding process, whereby said inner tubular member and said outer tubular member provide a unitary means for transport of studs and fluid to said welding device, said transfer member having a pair of connectors, one disposed at each end of said transfer member, each of said connectors having a first conduit interconnecting with said inner tubular member only and a second conduit interconnecting with said outer tubular member only, and means provided at said remote source of supply, and at said welding device for disconnecting said first conduit of said connector from said remote source of supply or from said welding device without disconnecting said second conduit of said connector from said remote source of supply or said welding device.

2. The combination of claim 1 wherein each said inner tubular member and said outer tubular member are fabricated of a flexible plastic material.

3. In combination with stud welding apparatus wherein fluid is fed from a remote source of supply and deposited about a weld area in a welding process and studs are automatically fed from a remote source of supply to a stud welding device, the improvement comprising a unitary tubular member for transporting both said studs and said fluid through separate passages disposed in said tubular member to said welding device which includes means disposed at an end of said tubular member adjacent said stud welding device for disconnecting said tubular member from said stud source of supply without disconnecting said tubular from said fluid source of supply.

4. The stud welding apparatus of claim 3 wherein said tubular member comprises an enclosed inner tubular member through which studs are transported, and an outer tubular member enveloping said inner tubular member through which fluid is transported to said welding device, and an inlet port disposed at one end of said transfer member communicating with said outer tubular member only and an outlet port at the opposite end of said transfer member communicating with said outer tubular member only.

5. The transfer member of claim 4 wherein each said inner tubular member and said outer tubular member are fabricated of a flexible plastic material.

* * * * *